United States Patent
Wu

(10) Patent No.: US 12,477,595 B2
(45) Date of Patent: Nov. 18, 2025

(54) PROVIDING WI-FI PROTECTED SETUP (WPS) BY SENDING A CODE TO A NETWORK DEVICE USING A PHONE

(71) Applicant: ARRIS Enterprises LLC, Suwanee, GA (US)

(72) Inventor: Yonghui Wu, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 215 days.

(21) Appl. No.: 18/017,159

(22) PCT Filed: Jul. 23, 2020

(86) PCT No.: PCT/CN2020/103773
§ 371 (c)(1),
(2) Date: Jan. 20, 2023

(87) PCT Pub. No.: WO2022/016446
PCT Pub. Date: Jan. 27, 2022

(65) Prior Publication Data
US 2023/0262787 A1    Aug. 17, 2023

(51) Int. Cl.
*H04W 76/10* (2018.01)
*H04W 12/08* (2021.01)
*H04W 84/12* (2009.01)

(52) U.S. Cl.
CPC ........... *H04W 76/10* (2018.02); *H04W 12/08* (2013.01); *H04W 84/12* (2013.01)

(58) Field of Classification Search
CPC ...... H04W 76/10; H04W 12/08; H04W 84/12
See application file for complete search history.

(56) References Cited

U.S. PATENT DOCUMENTS

| 10,230,522 | B1 * | 3/2019 | Roths | ................. H04L 67/12 |
| 2013/0298182 | A1 * | 11/2013 | May | ................. H04L 63/10 726/1 |

(Continued)

FOREIGN PATENT DOCUMENTS

| CN | 105472693 | 4/2016 |
| CN | 108541077 | 9/2018 |

OTHER PUBLICATIONS

International Search Report and the Written Opinion of the International Searching Authority dated Apr. 22, 2021 in International (PCT) Application No. PCT/CN2020/103773.

*Primary Examiner* — Vance M Little
(74) *Attorney, Agent, or Firm* — Wenderoth, Lind & Ponack, L.L.P.

(57) ABSTRACT

A network device initiating WPS with a client device based on receiving a signal from a phone. The network device receives a feature number code from a phone connected to the network device. The feature number code is entered on the phone using a keypad and causes the network device to initiate WPS with a client device. The network device sends the phone a first signal indicating that WPS has been triggered. The network device determines a success of the WPS to connect the client device to the Wi-Fi network. The network device sends the phone a second signal indicating that the client device successfully connected to the Wi-Fi network. The first and second signals may be audio signals that are emitted by the speaker of the phone. The network device stores client device connection information in memory.

20 Claims, 4 Drawing Sheets

(56) References Cited

U.S. PATENT DOCUMENTS

| | | | | |
|---|---|---|---|---|
| 2014/0053281 A1* | 2/2014 | Benoit | ............ | G06K 19/06037 726/29 |
| 2021/0203527 A1* | 7/2021 | Strater | ................. | H04W 24/02 |
| 2021/0368559 A1* | 11/2021 | Guo | ........................ | G10L 15/22 |

* cited by examiner

PROVIDING WI-FI PROTECTED SETUP (WPS) BY SENDING A CODE TO A NETWORK DEVICE USING A PHONE

BACKGROUND

The subject matter of the present disclosure relates to cause a network device to perform Wi-Fi Protected Setup (WPS) using a phone.

SUMMARY

Aspects of the present disclosure are drawn to a network device initiating WPS with a client device based on receiving a signal from a phone. The network device receives a feature number code from a phone connected to the network device. The feature number code is entered on the phone using a keypad and causes the network device to initiate WPS with a client device. The network device sends the phone a first signal indicating that WPS has been triggered. The network device determines a success of the WPS to connect the client device to the Wi-Fi network. The network device sends the phone a second signal indicating that the client device successfully connected to the Wi-Fi network. The first and second signals may be audio signals that are emitted by the speaker of the phone. The first and second signals may be text that is sent to the phone for display thereon. Alternatively, the first and second signals may be audio messages that are generated by the network device or pre-recorded audio messages that are stored at the network device. The network device may also store client device connection information in memory.

BRIEF SUMMARY OF THE DRAWINGS

The accompanying drawings, which are incorporated in and form a part of the specification, illustrate example embodiments and, together with the description, serve to explain the principles of the present disclosure. In the drawings.

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

Currently, to cause a network device to perform Wi-Fi Protected Setup (WPS) for a client device, the user has to physically go to the network device to press a WPS button. Often, a corresponding button may need to be pressed on the client device. If the user is another room or on another floor of the house, the user is inconvenienced by having to go to the physical location of the network device. However, a phone is often connected to the network device to provide telephony services, such as voice and fax services.

The subject matter of the present disclosure is directed to enabling a network device to initiate WPS with a client device based on receiving a signal from a phone. The network device receives a feature number code from a phone connected to the network device. The feature number code is entered on the phone using a keypad and causes the network device to initiate WPS with a client device. The network device sends the phone a first signal indicating that WPS has been triggered. The network device monitors the WPS to detect success of connecting the client device to the Wi-Fi network. The network device sends the phone a second signal indicating that the client device successfully connected to the Wi-Fi network. The first and second signals may be audio signals that are emitted by the speaker of the phone. The first and second signals may be text that is sent to the phone for display thereon. Alternatively, the first and second signals may be audio messages that are generated by the network device or pre-recorded audio messages that are stored at the network device. The connection information of the client device may be stored in memory.

Figure 1:
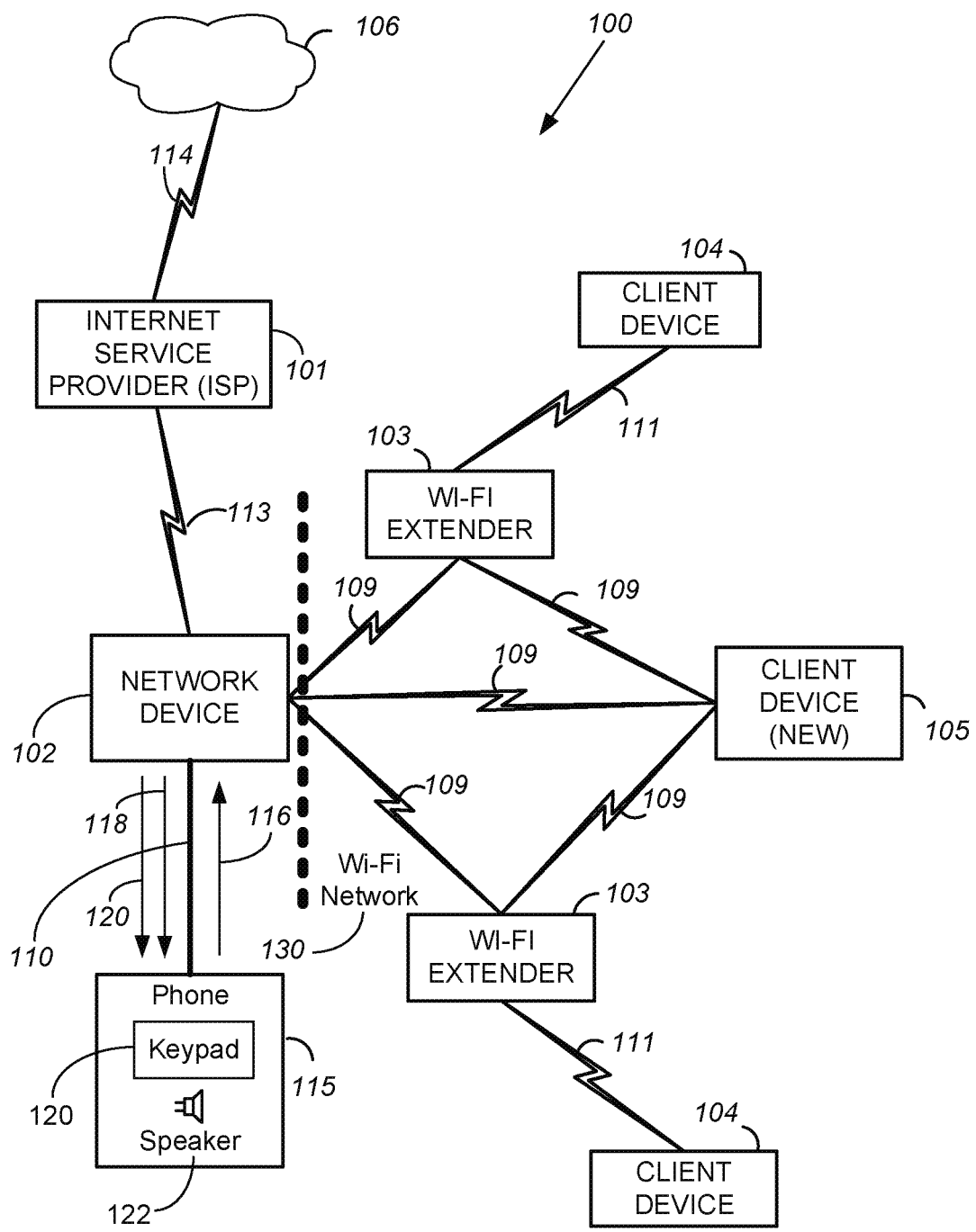
FIG. 1 is a schematic diagram of a system.

FIG. 1 is a schematic diagram of a system 100.

As shown in FIG. 1, the system includes a network device 102 connected to the Internet 106 via an Internet Service Provider (ISP) 101 and also connected to different wireless devices such as wireless extenders 103 and client devices 104, 105. The system shown in FIG. 1 includes wireless devices (e.g., wireless extenders 103 and client devices 104, 105) that may be connected in one or more wireless networks (e.g., private, guest, iControl, backhaul network, or Internet of things (IoT) network) within the system. Additionally, there could be some overlap between wireless devices (e.g., wireless extenders 103 and client devices 104, 105) in the different networks. That is, one or more network devices could be located in more than one network. For example, the wireless extenders 103 could be located both in a private network for providing content and information to a client device 104 and also included in a backhaul network or an iControl network.

Starting from the top of FIG. 1, the ISP 101 can be, for example, a streaming video provider or any computer for connecting the network device 102 to the Internet 106. The connection 114 between the Internet 106 and the ISP 101 and the connection 113 between the ISP 101 and the network device 102 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 113 can further include as some portion thereof a broadband mobile phone network connection, an optical network connection, or other similar connections. For example, the connection 113 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 113 is capable of providing connections between the network device 102 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The network device 102 can be, for example, a hardware electronic device that may be a combination modem and gateway device that combines the functions of a modem, an access point, and/or a router for providing content received from the content provider (e.g., ISP 101) to network devices (e.g., wireless extenders 103 and client devices 104, 105) in the system. It is also contemplated by the present disclosure that the network device 102 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connections 109 between the network device 102, the wireless extenders 103, and client devices 104, 105 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connections 109 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connections 109 can include connections to a media over coax (MoCA) network. One or more of the connections 109 can also be a wired Ethernet connection.

The wireless extenders 103 can be, for example, hardware electronic devices such as access points used to extend the wireless network by receiving the signals transmitted by the network device 102 and rebroadcasting the signals to, for example, client devices 104, 105, which may out of range of the network device 102. The wireless extenders 103 can also receive signals from the client devices 104, 105 and rebroadcast the signals to the network device 102, or other client devices 104, 105.

The connections 111 between the wireless extenders 103 and the client devices 104, 105 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 111 can be implemented using a wireless connection that operates in accordance with, but is not limited to, RF4CE protocol, ZigBee protocol, Z-Wave protocol, or IEEE 802.15.4 protocol. Also, one or more of the connections 111 can be a wired Ethernet connection.

The client devices 104, 105 can be, for example, handheld computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the network device 102. Additionally, the client devices 104, 105 can be a TV, an IP/QAM STB or an SMD that is capable of decoding audio/video content and playing over OTT or MSO provided content received through the network device 102.

The connection 109 between the network device 102 and the client device 104 is implemented through a wireless connection that operates in accordance with, but is not limited to, any IEEE 802.11 protocols. Additionally, the connection 109 between the network device 102 and the client device 104 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 109 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection.

Figure 2:
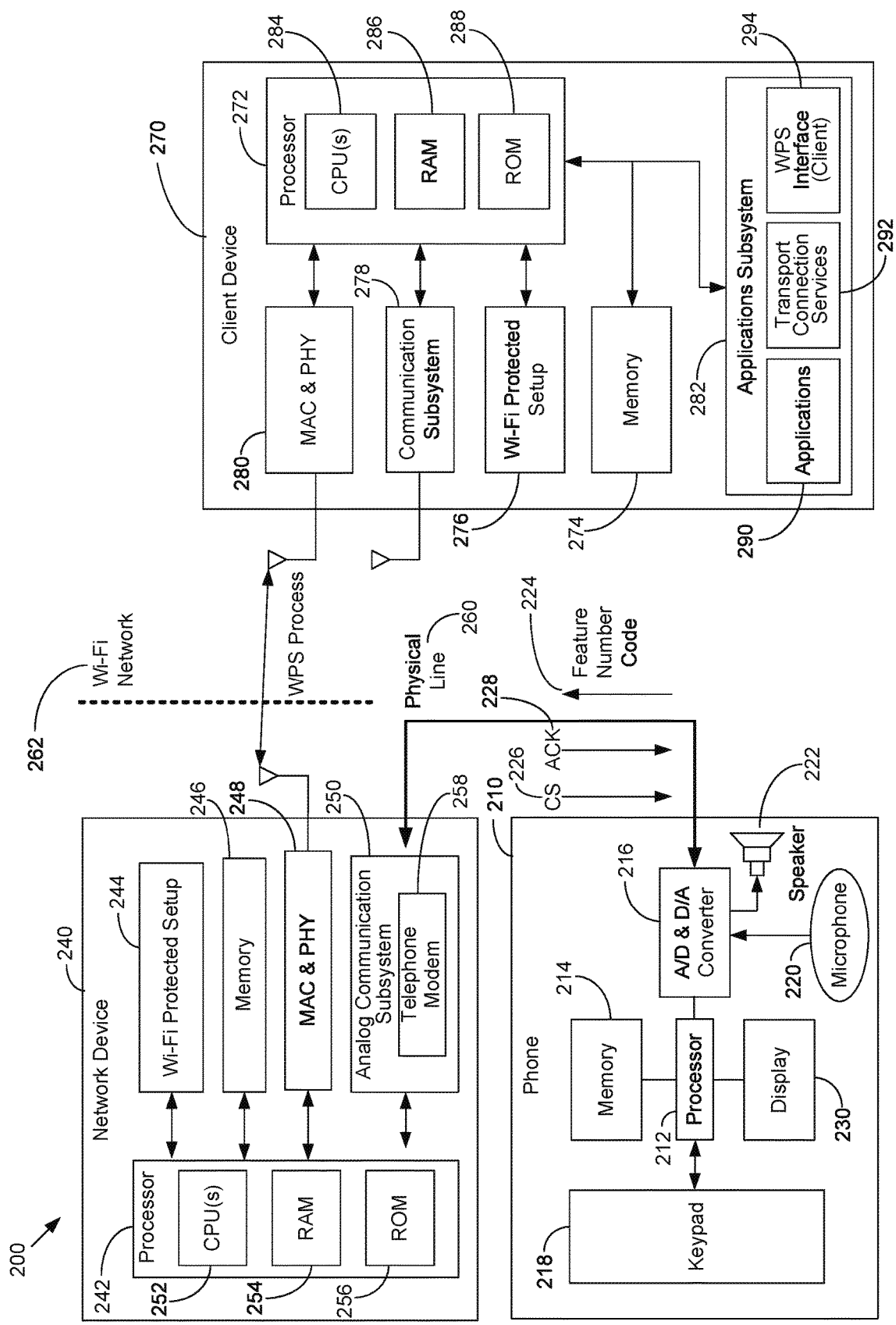
FIG. 2 illustrates a block diagram of the system components.

A detailed description of the exemplary internal components of the network device 102, the wireless extenders 103, and the client devices 104, 105 shown in FIG. 1 will be provided in the discussion of FIG. 2. However, in general, it is contemplated by the present disclosure that the network device 102, the wireless extenders 103, and the client devices 104, 105 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the network device 102, the wireless extenders 103, and the client devices 104, 105 may be adapted to execute any operating system, including Linux, UNIX, Windows, MacOS, DOS, and ChromOS as well as virtual machines adapted to virtualize execution of a particular operating system, including customized and proprietary operating systems. The network device 102, the wireless extenders 103, and the client devices 104, 105 are further equipped with components to facilitate communication with other computing devices over the one or more network connections to local and wide area networks, wireless and wired networks, public and private networks, and any other communication network enabling communication in the system.

Client device 105 is shown as being new and needs to join the network through network device 102. Phone 115 is connected to network device 102 by a physical line 110. The network device 102 receives a feature number code 116 from a phone 115 connected to the network device 102 by line 110. The feature number code 116 is entered on the phone 115 using a keypad 120 and causes the network device 102 to initiate WPS with a client device 105 to connect client device 105 to the Wi-Fi network 130. The network device 102 sends the phone 115 a confirmation signal 118 by line 110 that indicates that WPS has been triggered between client device 105 and network device 102. The network device 102 monitors the WPS to detect success of connecting the client device 105 to the Wi-Fi network 130. The network device 102 sends the phone 115 an acknowledgement signal 120 indicating that the client device 105 successfully connected to the Wi-Fi network 130. The confirmation signal 118 and acknowledgement signal 120 may be an audio message. An audio message for the confirmation signal 118 and acknowledgement signal 120 may be generated by the network device 102 and then sent to the phone 115. Alternatively, the audio signal for the confirmation signal 118 and acknowledgement signal 120 may be a pre-recorded audio message that is stored by the network device 102 and sent to the phone 115 as described above. The audio signals may be emitted by a speaker 122 of the phone 115. The confirmation signal 118 and acknowledgement signal 120 may also be text that is stored by the network device 102 and sent to the phone 115 for display by the phone 114.

FIG. 2 illustrates a block diagram of the system components 200.

In FIG. 2, a phone 210 is connected to network device 240 using a physical line 260. A user wants to connect client device 270 to a Wi-Fi network 262 provided by network device 240. Phone 210 includes a processor 212, memory 214, analog-to-digital converter (ADC)/digital-to-analog converter (DAC) 216, keypad 218, microphone 220, and speaker 222. ADC/DAC 216 converts analog signals received from network device 240 to digital signals for handling by processor 212 and converts digital signals from processor 212 to analog signals that are provided to network device 240.

Network device 240 includes a processor 242, a Wi-Fi Protected Setup controller 244, memory 246, a media access controller (MAC) and physical transceiver (PHY) 248, and analog communication system 250. Processor 242 includes CPUs 252, random access memory (RAM) 254, and read-only memory (ROM) 256. Analog communication system 250 includes a telephone modem 258. Wi-Fi Protected Setup controller 244 of network device 240 controls the WPS on the network device 240. Telephone modem 258 modulates data into a format suitable for transmission to phone 210 over physical line 260 and demodulates data received from phone 210 over physical line 260.

Client device 270 includes a processor 272, memory 274, a Wi-Fi Protected Setup (WPS) component 276, a communication system 278, and media access controller (MAC) and physical transceiver (PHY) 280, and an applications subsystem 282. Processor 272 includes CPUs 284, random access memory 286, and read-only memory 288. Wi-Fi Protected Setup (WPS) component 276 of client device 270 controls the WPS on the client device 270. Applications subsystem 282 includes applications 290, transport connection services 292, and WPS interface 294. Applications 290 provide application services such as load balancing, application performance monitoring, application acceleration, autoscaling, micro-segmentation, service proxy and service discovery. Transport connection services 292 provide reliable communication between processes and involve the establishment of connections between the client device 270 and network device 240. WPS interface 294 provides a client user interface to present WPS information.

Currently, to cause network device 240 to perform Wi-Fi Protected Setup (WPS) for client device 270, the user has to physically go to the network device 240 to press a WPS button. Often, a corresponding button may need to be pressed on the client device 270. If the user is another room or on another floor of the house, the user is inconvenienced by having to go to the physical location of the network device 240. However, a phone 210 is often connected to the network device 240 that provides voice services for phone 210.

The subject matter of the present disclosure provides execution of WPS between a network device 240 and client device 270 to connect the client device to the Wi-Fi network 262 by sending a feature number code from phone 210 to network device 240.

Phone 210 is connected to network device 240 by a physical line 260. The network device 240 receives a feature number code from phone 210 through physical line 260. The feature number code is entered on the phone 210 using a keypad 218 and causes the network device 240 to initiate WPS with client device 270 to connect client device 270 to the Wi-Fi network 260. When the network device 240 receives the feature number code through line 260 from phone 210, network device 240 initiates communication with client device 270.

When the network device 240 begins to communicate with the client device 270 to perform WPS, the network device 240 sends a confirmation signal 226 by physical line 260 to phone 210. Confirmation signal 226 indicates that WPS has been triggered between client device 270 and network device 240. The network device 102 monitors the WPS process to detect success of connecting the client device 270 to the Wi-Fi network 262. The network device 240 then sends the phone 210 an acknowledgement signal 228 indicating that the client device 270 successfully connected to the Wi-Fi network 262. The confirmation signal 226 and acknowledgement signal 228 may be an audio signal that is generated by the processor 242 of the network device 240 and then sent to the phone 210. Alternatively, the audio signal for the confirmation signal 226 and acknowledgement signal 228 may be a pre-recorded audio message that is stored in memory 246 by the network device 240 and sent to the phone 210 as described above. For example, the user may record an audio message using phone 210 that is sent to memory 246 of network device 240. The audio signals when received by the phone 210 may be emitted by a speaker 220 of the phone 210. The confirmation signal 118 and acknowledgement signal 120 may also be text that is stored in memory 246 by the network device 240 and sent to the phone 210 for presentation on display 230.

Thus, the user does not have to go to where the network device 240 is located. Rather, the user picks up the phone and enters the feature number code 224 on the keypad 218. The feature number code 224 is then sent to network device 240, which controls the WPS with the client device 270.

Figure 3:
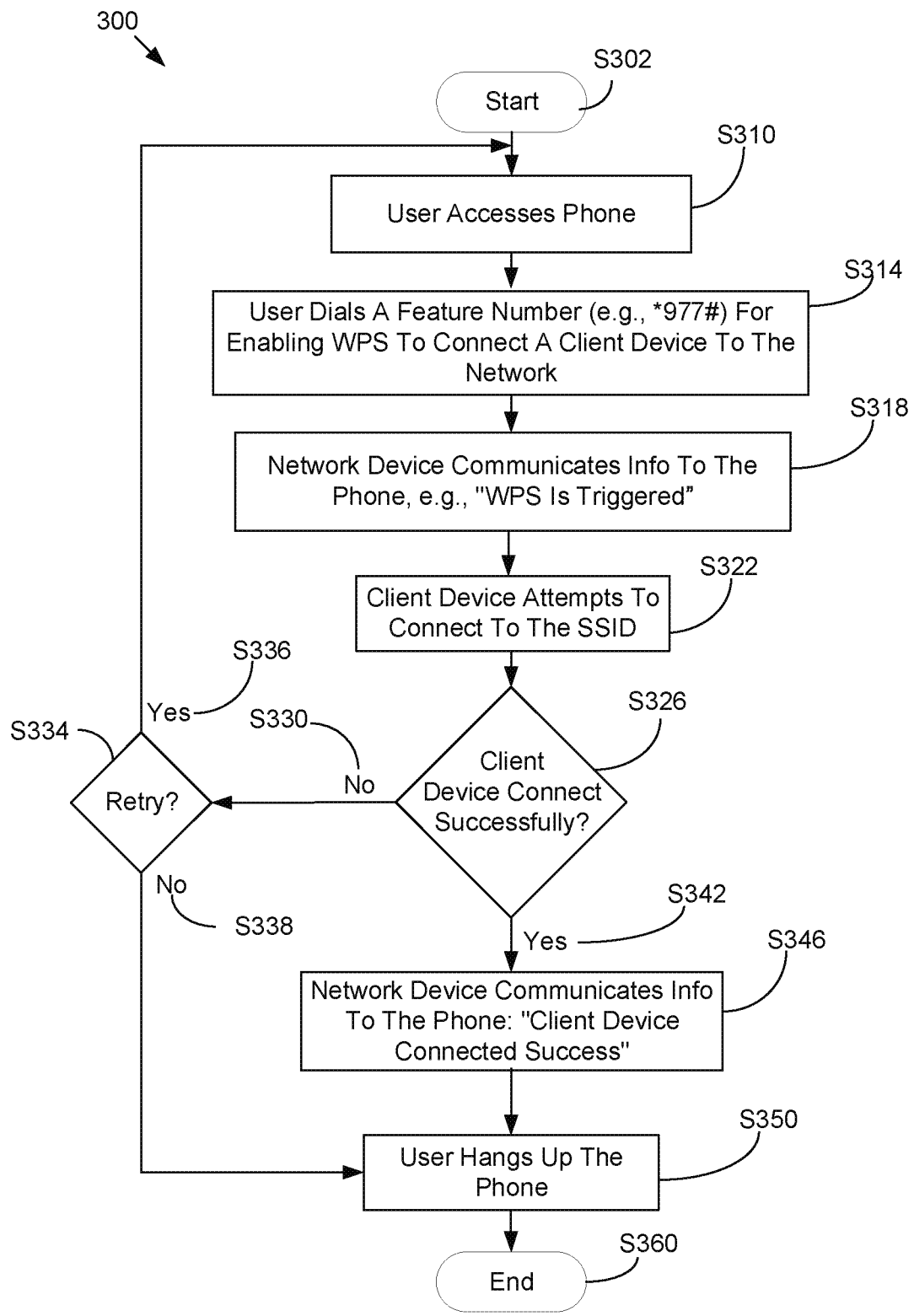
FIG. 3 is a flow chart of a method for a network device to initiate WPS with a client device based on receiving a feature number code from a phone.

FIG. 3 is a flow chart of a method 300 for a network device to initiate WPS with a client device based on receiving a feature number code from a phone.

In FIG. 3, method 300 starts (S402), and a user accesses a phone (S310). A user dials a feature number (e.g., *977 #) for enabling WPS to connect a client device to the network (S314). The network device communicates information to the phone, e.g., "WPS Is Triggered" (S318). The client device attempts to connect to the SSID (S322). A determination is made whether the client connected successfully (S326). When the client device did not connect successfully (S330), a determination is made whether WPS is to be tried again (S334). When WPS is to be tried again (S336), the process returns to the start (S302). When WPS is not to be tried again, the user hangs up the phone (S350) and the process terminates (S360).

If the client device connected successfully (S342), network device communicates information to the phone: "Client Device Connected Success" (S346). Next, the user hangs up the phone (S350) and the process terminates (360). The information communicated to the phone in steps (S318) and (S346) may be, as illustrated in FIG. 2, a confirmation signal 226 and acknowledgement signal 228. The confirmation signal 226 and acknowledgement signal 228 may be an audio signal that is generated by the processor 242 of the network device 240 and then sent to the phone 210. Alternatively, the audio signal for the confirmation signal 226 and acknowledgement signal 228 may be a pre-recorded audio message that is stored in memory 246 by the network device 240 and sent to the phone 210 as described above. The audio signals when received by the phone 210 may be emitted by a speaker 220 of the phone 210. The confirmation signal 118 and acknowledgement signal 120 may also be text that is stored in memory 246 by the network device 240 and sent to the phone 210 for presentation on display 230.

Figure 4:
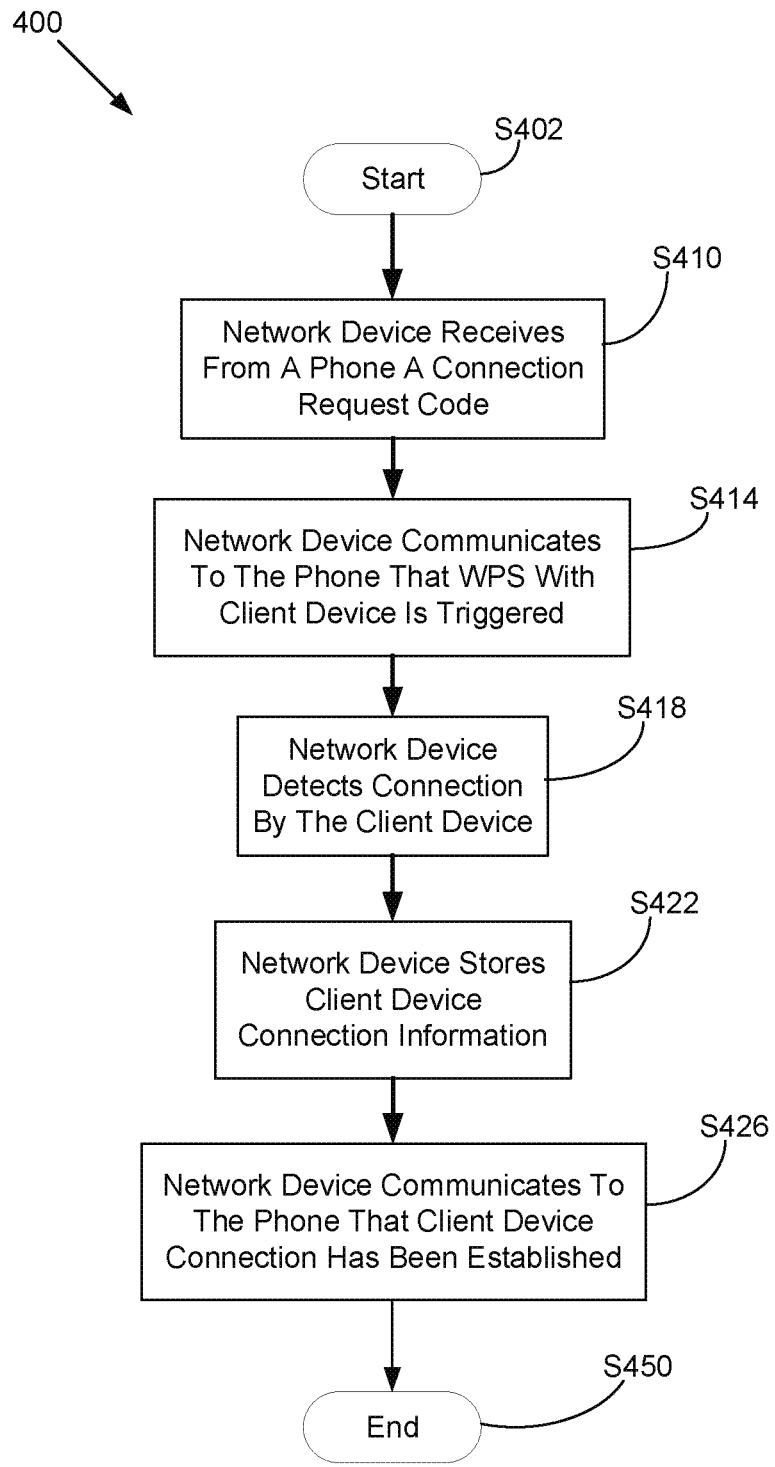
FIG. 4 is a flow chart of a method performed by a network device to perform WPS with a client device based on receiving a feature number code from a phone.

FIG. 4 is a flow chart of a method 400 performed by a network device to perform WPS with a client device based on receiving a feature number code from a phone.

In FIG. 4, method 400 starts (S402), and a network device receives from a phone a connection request code (S410). The network device communicates to the phone that WPS with client device is triggered (S414). The network device detects connection by the client device (S418). The network device stores client device connection information (S422). The network device communicates to the phone that client device connection has been established (S426). Then, the process terminates (S450). As described above, the communication in steps (S414) and (S426) may be, as illustrated in FIG. 2, a confirmation signal 226 and acknowledgement signal 228. The confirmation signal 226 and acknowledgement signal 228 may be an audio signal that is generated by the processor 242 of the network device 240 and then sent to the phone 210. Alternatively, the audio signal for the confirmation signal 226 and acknowledgement signal 228 may be a pre-recorded audio message that is stored in memory 246 by the network device 240 and sent to the phone 210 as described above. The audio signals when received by the phone 210 may be emitted by a speaker 220 of the phone 210. The confirmation signal 118 and acknowledgement signal 120 may also be text that is stored in memory 246 by the network device 240 and sent to the phone 210 for presentation on display 230.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device for use with a phone having a speaker and a keypad, the network device comprising:
   a memory; and
   a processor configured to execute instructions stored on the memory to cause the network device to:
      receive, at the network device and from the phone, a feature number code entered using the keypad of the phone which is connected to the network device;
      initiate, by the network device, Wi-Fi Protected Setup (WPS) with a client device based on the receiving the feature number code entered using the keypad of the phone, wherein the feature number code causes the network device to initiate the WPS with the client device;
      send, from the network device to the phone, a first communication signal indicating that the WPS has been initiated by the network device based on the receiving the feature number code entered using the keypad of the phone;
      determine, by the network device, a success of the WPS initiated by the network device to connect the client device to a Wi-Fi network; and
      send, from the network device to the phone, a second communication signal indicating that the client device successfully connected to the Wi-Fi network.

2. The network device of claim 1, wherein the processor is further configured to terminate the WPS after the sending the second communication signal from the network device to the phone.

3. The network device of claim 1, further comprising an analog communication system, wherein the processor is further configured to use the analog communication system in the receiving the feature number code from the phone to initiate, by the network device, the WPS with the client device and in the sending the first communication signal from the network device to the phone.

4. The network device of claim 3, wherein the first communication signal further comprises a first audio communication signal emitted by the speaker of the phone stating that the WPS has been initiated by the network device.

5. The network device of claim 1, wherein the first communication signal further comprises a first audio communication signal emitted by the speaker of the phone stating that the WPS has been initiated by the network device.

6. The network device of claim 1, further comprising an analog communication system, wherein the processor is further configured to use the analog communication system in the sending the second communication signal from the network device to the phone, and the second communication signal further comprises a second audio communication signal emitted by the speaker of the phone stating that the client device successfully connected to the Wi-Fi network.

7. The network device of claim 1, wherein the processor is further configured to store client device connection information in the memory.

8. A method for providing, by a network device, wireless protected setup (WPS) of a client device to a Wi-Fi network, the method comprising:
   receiving, at the network device and from a phone which is connected to the network device, a feature number code entered using a keypad of the phone;
   initiating, by the network device, the WPS with the client device based on the receiving the feature number code entered using the keypad of the phone, wherein the feature number code causes the network device to initiate the WPS with the client device;
   sending, from the network device to the phone, a first communication signal indicating that the WPS has been initiated by the network device based on the receiving the feature number code entered using the keypad of the phone;
   determining, by the network device, a success of the WPS initiated by the network device to connect the client device to the Wi-Fi network; and
   sending, from the network device to the phone, a second communication signal indicating that the client device successfully connected to the Wi-Fi network.

9. The method of claim 8, further comprising terminating the WPS by the network device after the sending the second communication signal from the network device to the phone.

10. The method of claim 8, further comprising using an analog communication system of the network device in the receiving the feature number code from the phone to initiate, by the network device, the WPS with the client device and in the sending the first communication signal from the network device to the phone.

11. The method of claim 10, wherein the sending the first communication signal from the network device to the phone further comprises sending a first audio communication signal from the network device to the phone to be emitted by a speaker of the phone stating that the WPS has been initiated by the network device.

12. The method of claim 8, wherein the sending the first communication signal from the network device to the phone further comprises sending a first audio communication signal from the network device to the phone to be emitted by a speaker of the phone stating that the WPS has been initiated by the network device.

13. The method of claim 8, further comprising using an analog communication system of the network device in the sending the second communication signal from the network device to the phone, wherein the sending the second communication signal from the network device to the phone further comprises sending an audio communication signal emitted by a speaker of the phone stating that the client device successfully connected to the Wi-Fi network.

14. The method of claim 8, further comprising storing client device connection information in a memory.

15. A non-transitory, computer-readable media having computer-readable instructions stored thereon, the computer-readable instructions being capable of being read by a processor of a network device and instructing the processor of the network device to perform a method for providing wireless protected setup (WPS) with a client device, the method comprising:
   receiving, at the network device and from a phone which is connected to the network device, a feature number code entered using a keypad of the phone;
   initiating, by the network device, the WPS with the client device based on the receiving the feature number code entered using the keypad of the phone, wherein the feature number code causes the network device to initiate the WPS with the client device;
   sending, from the network device to the phone, a first communication signal indicating that the WPS has been initiated by the network device based on the receiving the feature number code entered using the keypad of the phone;
   determining, by the network device, a success of the WPS initiated by the network device to connect the client device to a Wi-Fi network; and
   sending, from the network device to the phone, a second communication signal indicating that the client device successfully connected to the Wi-Fi network.

16. The non-transitory, computer-readable media of claim 15, wherein the method further comprises terminating the WPS by the network device after the sending the second communication signal from the network device to the phone.

17. The non-transitory, computer-readable media of claim 15, wherein the method further comprises using an analog communication system of the network device in the receiving the feature number code from the phone to initiate, by the network device, the WPS with the client device and in the sending the first communication signal from the network device to the phone.

18. The non-transitory, computer-readable media of claim 17, wherein the sending the first communication signal from the network device to the phone further comprises sending a first audio communication signal from the network device to the phone to be emitted by a speaker of the phone stating that the WPS has been initiated by the network device.

19. The non-transitory, computer-readable media of claim 15, wherein the sending the first communication signal from the network device to the phone further comprises sending a first audio communication signal from the network device to the phone to be emitted by a speaker of the phone stating that the WPS has been initiated by the network device.

20. The non-transitory, computer-readable media of claim 15, wherein the method further comprises using an analog communication system of the network device in the sending the second communication signal from the network device to the phone, wherein the sending the second communication signal from the network device to the phone further comprises sending an audio communication signal emitted by a speaker of the phone stating that the client device successfully connected to the Wi-Fi network.

* * * * *